United States Patent [19]

Strubbe

[11] Patent Number: 4,934,985
[45] Date of Patent: Jun. 19, 1990

[54] COMBINE GROUND SPEED CONTROL SYSTEM

[75] Inventor: Gilbert J. I. Strubbe, Loppemsestraat, Belgium

[73] Assignee: Ford New Holland, Inc., New Holland, Pa.

[21] Appl. No.: 366,056

[22] Filed: Jun. 14, 1989

[30] Foreign Application Priority Data

Jun. 23, 1988 [GB] United Kingdom ............... 8814936

[51] Int. Cl.$^5$ ............................................ A01D 41/02
[52] U.S. Cl. .................................... 460/4; 56/10.2; 56/DIG. 15
[58] Field of Search .............. 56/10.2, DIG. 15; 460/4, 5, DIG. 903

[56] References Cited

U.S. PATENT DOCUMENTS

| 3,515,144 | 6/1970 | Morrison | 460/4 |
| 3,574,307 | 4/1971 | Theobald | 460/4 |
| 4,130,980 | 12/1978 | Fardal et al. | 56/10.2 |
| 4,513,562 | 4/1985 | Strubbe | 56/10.2 |

FOREIGN PATENT DOCUMENTS

0122343 1/1988 European Pat. Off.

Primary Examiner—Stephen J. Novosad
Attorney, Agent, or Firm—Larry W. Miller; Frank A. Seemar; Darrell F. Marquette

[57] ABSTRACT

A combine harvester having an engine, a traction drive transmission, a header, a threshing and separating mechanism and a machine throughput control system is disclosed wherein a grain loss control loop is operable to produce a signal representative of grain loss and including a grain loss controller to which the grain loss signal and a reference grain loss signal are applied. A grain separation control loop is also provided to produce a signal representative of the grain separation in the machine. The grain loss controller is operable continuously to derive a reference grain separation signal from the grain separation signal, the grain loss signal and the reference grain loss signal. Means is also provided for algebraically summing the grain separation signal and the reference grain separation signal to produce a grain separation error signal which is used to control the machine throughput.

15 Claims, 6 Drawing Sheets

Fig. 2(con't)

COMBINE GROUND SPEED CONTROL SYSTEM

BACKGROUND OF THE INVENTION

This invention relates generally to combine harvesters and, more particularly, to such machines fitted with some form of control system operable to adjust the amount of crop material passing through the machine by varying the ground speed of the combine.

The term "grain" will be used principally throughout this specification for convenience and it should be understood that the term is not intended to be limiting. Thus "grain" refers to that part of the crop which is threshed and separated from the discardable part of the crop material.

The purpose of control systems for combine harvesters is to maximize the capacity of the machine and yet minimize grain loss. Numerous control systems have been proposed but to date, no system has been commercially adapted for combine harvesters primarily because all systems so far proposed are impracticable in the sense that they do not meet the stated objective in a wholly satisfactory manner. The main factor affecting the practicability of combine harvester control systems is that of grain loss. On the one hand, a control system which does not take account of grain loss cannot seriously be entertained because grain loss is a highly critical factor in the harvesting operation. On the other hand, a control system which does take account of grain loss was suspect up till now in that there was no method of measuring grain loss in absolute terms. However, according to the co-pending European Patent Application No. 88.200.802.2, there now is provided a method for measuring grain loss in absolute terms by detector means as described in the co-pending European Patent Applications Nos. 88.200.801.4 and 88.200.803.0 and by a plurality of measurements of the grain separation at different locations along the length of the threshing and separating mechanism.

A problem with utilizing some form of grain loss measurement to effect machine control is however that the control loop is relatively slow because a given volume of crop material takes a finite time (typically 10 seconds in conventional combine harvesters and approximately 5 seconds in rotary combine harvesters) to progress through the machine before the grain loss associated with that volume is measured. With such a slow control loop, the control system can become unstable in that it oscillates or hunts between maximum and minimum control. This problem is also associated with any other parameter of the machine which may be used in the control system and which is related to some crop processing component located in the machine such that there is a significant time delay between crop material entering the machine and reaching that component.

Many of the control systems proposed to date adjust the ground speed of the combine harvester in order to control the intake of crop material (i.e. to control machine loading). The intake of a constant amount of crop material however, does not guarantee a constant grain loss level. Moreover, crop characteristics, weather conditions and machine adjustments have multiple influences on the machine loading detecting means which are not necessarily reflected in the grain separation process and hence in the grain loss. Control of the intake of the crop material therefore does not directly involve that the grain loss level is in control.

For the foregoing reason, other proposed control systems, such as disclosed in EP-B-No. 0.122.343, comprise a combined master and slave control loop in which the slave loop controls the intake of crop material (i.e. the machine loading) while the master loop controls the grain loss. The set value of the intake of crop material (i.e. the desired loading of the machine under the instant operating conditions) established by the master loop is combined with the output signal of the slave loop in order to control the ground speed of the combine. As such, an adaptive action is obtained in which the relation between the grain loss level and the intake level of crop material is continuously adjusted.

However, a problem again encountered when utilizing the intake of crop material and the grain loss in a combined adaptive control is that the parameters of the relation between intake of crop material and the grain loss vary too much in the same field because of the mentioned multiple influences. This fluctuating relation renders the control system unstable by oscillating between maximum and minimum set values for the intake of crop material, as set by the master loop.

Another problem with said combined adaptive control arises from the variation in the type of relation, depending on external influences. Under certain conditions, the relation is experienced as being exponential. More explicitly, this means that grain loss increases exponentially with a linear increase of the intake of crop material. It will be appreciated that as a result a dangerous situation is created in which an only small increase in machine throughput could lead to excessive grain loss. Also, in the mean time, a bad influence on the stability of the control system is experienced, which inevitably will start to oscillate between minimum and maximum set values.

SUMMARY OF THE INVENTION

It is an object of the present invention to overcome the aforementioned problems of the prior art by providing a combine harvester having a viable throughput control system based on the concept of providing a stable control loop associated with grain separation detected in the threshing and separating mechanism and by fine tuning that control loop by another control loop associated with grain loss.

According to the present invention there is provided a combine harvester having an engine, a traction drive transmission, a header, a threshing and separating mechanism and a machine throughput control system comprising a grain loss control loop operable to produce a signal representative of grain loss and including a grain loss controller to which the grain loss signal and a reference grain loss signal are applied, characterized in that the machine throughput control system further comprises a grain separation control loop operable to produce a signal representative of the grain separation in the machine, the grain loss controller is operable continuously to derive a reference grain separation signal from the grain separation signal, the grain loss signal and the reference grain loss signal, and means are provided for algebraically summing the grain separation signal and the reference grain separation signal to produce a grain separation error signal which is used to control the machine throughput.

On the one hand, a good relationship has been found between grain separation in a combine and the grain loss while on the other hand also a good relation, more specifically of a linear type, was experienced between the grain separation and the ground speed. The relationship between grain separation and grain loss will hereinafter be referred to as "the first causal relationship".

The grain separation is detected by grain impact sensors as described in the already mention co-pending European Patent Applications Nos. 88.200.801.4 and 88.200.803.0 and the grain loss is determined by an algorithm as described in the co-pending European Patent Application No. 88.200.802.2. This algorithm is in the form of a formula which calculates the grain loss from signals received from three or more impact detectors placed along the threshing and separating machanism and from sensors for measuring operating condition parameters. The algorithm as described in the mentioned European application will not be described here in details, but will further be called a loss algorithm which produces a loss signal.

Preferably, the grain separation control loop comprises a sensor operable to measure the grain separation under the rotary separator. This is the most forward place up till now in the threshing and separating mechanism where a grain separation sensor can measure the grain separation over the total width of the combine harvester without being saturated by the amounts of grain which are locally separated. In a preferred embodiment, the detector is of a construction as described in the co-pending European Patent Application No. 88.200.803.0. According to this application, the detector plate member is provided with signal damping means around its periphery which allow a very high detection rate capability. In case techniques would come available, permitting grain separation measurements at still much higher rates, then it would be possible to already measure grain separation totally at the front of the threshing and separating mechanism, namely under the threshing drum.

In this manner, a very fast grain separation control loop is provided, thus giving stability and quick reaction to the control system. This is because the grain separation sensor used in the grain separation control system is located virtually at the front of the threshing and separating machanism, so that there is only a small time delay between crop material entering the machine after having been cut by the sickle bar and reaching the separating mechanism.

The grain separation sensor under the rotary separator moreover forms part of the set of sensors which provide input signals to the mentioned grain loss algorithm and accordingly provides an advantage in that it realizes a stable first causal relationship, i.e. a stable relationship between the grain separation detected under the rotary separator and the grain loss signal determined by the grain loss algorithm.

The grain separation control loop further comprises a PID-controller and ground speed control loop to which the output of the PID-controller is connected. This ground speed control loop preferably comprises a traction drive transmission and a traction variator and automatically adjusts the ground speed following a set value derived from the output of the PID-controller.

The grain separation control loop preferably also comprises a grain separation controller which receives output signals from the grain separation sensor and a ground speed signal, via a time delay operable to present the ground speed signal in phase with the grain separation signal. The grain separation controller is operable continuously to establish a causal relationship between ground speed and grain separation, with the ground speed signal being applied against that relationship current at that time to derive a corresponding representative grain separation signal. Preferably, this representative grain separation signal is used in lieu of the actual grain separation signal for algebraic summation with the aforementioned reference grain separation signal. The relationship between ground speed and grain separation will hereinafter be referred to as "the second causal relationship".

The grain separation controller preferably comprises a grain separation parameter estimator operable continuously to establish the causal relationship between the ground speed and the grain separation, a grain separation estimator operable to derive an estimated grain separation signal from the ground speed signal and that causal relationship, and a further time delay operable to present the estimated grain separation signal in phase with the measured grain separation signal to first summer means for algebraic summation to produce an error signal. The grain separation controller may further comprise second summer means for adding the error signal to the estimated grain separation signal to produce the representative grain separation signal already mentioned.

The grain loss control loop may comprise, as already mentioned, grain separation sensors providing input to a grain loss algorithm and a grain loss controller, the grain loss controller receiving the output signal from the grain loss algorithm and a signal from the grain separation control loop via a time delay operable to make the grain separation signal in phase with the grain loss signal, and the grain loss controller being operable to establish said causal relationship between grain separation and grain loss, and to derive said reference grain separation signal.

Preferably the grain loss controller comprises a grain loss parameter estimator operable continuously to establish the causal relationship between the machine grain separation signal received via the time delay and the grain loss signal, and a loss estimator operable to derive an estimated loss signal from the grain separation signal and the causal relationship current therewith. The grain loss controller may also comprise a further time delay operable to present the estimated loss signal in phase with the measured loss signal, first summer means for algebraically summing the estimated loss signal received from the further time delay and the measured loss signal to produce an error signal, second summer means for adding the error signal to the estimated loss signal to produce a representative loss signal, third summer means for algebraically summing the representative loss signal and the reference loss signal to produce a loss error signal, and convertor means for applying the loss error signal against the causal relationship current at that time to derive therefrom the reference grain separation signal.

Alternatively, the grain loss controller may comprise a grain loss parameter estimator operable continuously to establish the first causal relationship between the grain separation signal received via the time delay and the grain loss signal received from the loss algorithm, first convertor means for applying the grain loss signal against the causal relationship current at that time to derive therefrom an equivalent grain separation signal, first summer means for algebraically summing the equivalent machine loading signal and the grain separation signal received from the time delay to produce an error signal, second summer means for adding the error signal to the measured grain separation signal to produce a revised grain separation signal, second convertor means for applying the reference loss signal against the first causal relationship current at that time to derive therefrom a corresponding grain separation signal, and third summer means for algebraically summing the corresponding grain separation signal derived from the reference loss signal and the revised grain separation signal to derive therefrom the reference grain separation signal already mentioned. The grain loss controller may comprise shift register means to which the grain separation and grain loss signals are applied, means for establishing the first causal relationship and means for deriving said reference grain separation signal. Preferably the means for deriving estimated loss signals from machine grain separation signals, and means for establishing the first causal relationship employ a two parameter model, analysis of which may be effected using either the regression analysis or cluster analysis technique.

The two parameter model is expressed as:

$$L = A + BS_1 \text{ or } L = Ae^{BS_1}$$

where L equals grain loss, $S_1$ equals grain separation and A and B are relation parameters to be determined by the analysis.

BRIEF DESCRIPTION OF THE DRAWINGS

A combine harvester in accordance with the present invention will now be described in greater detail, by way of example, with reference to the accompanying drawings, wherein.

DETAILED DESCRIPTION OF THE PREFERRED EMBODIMENT

Figure 1:
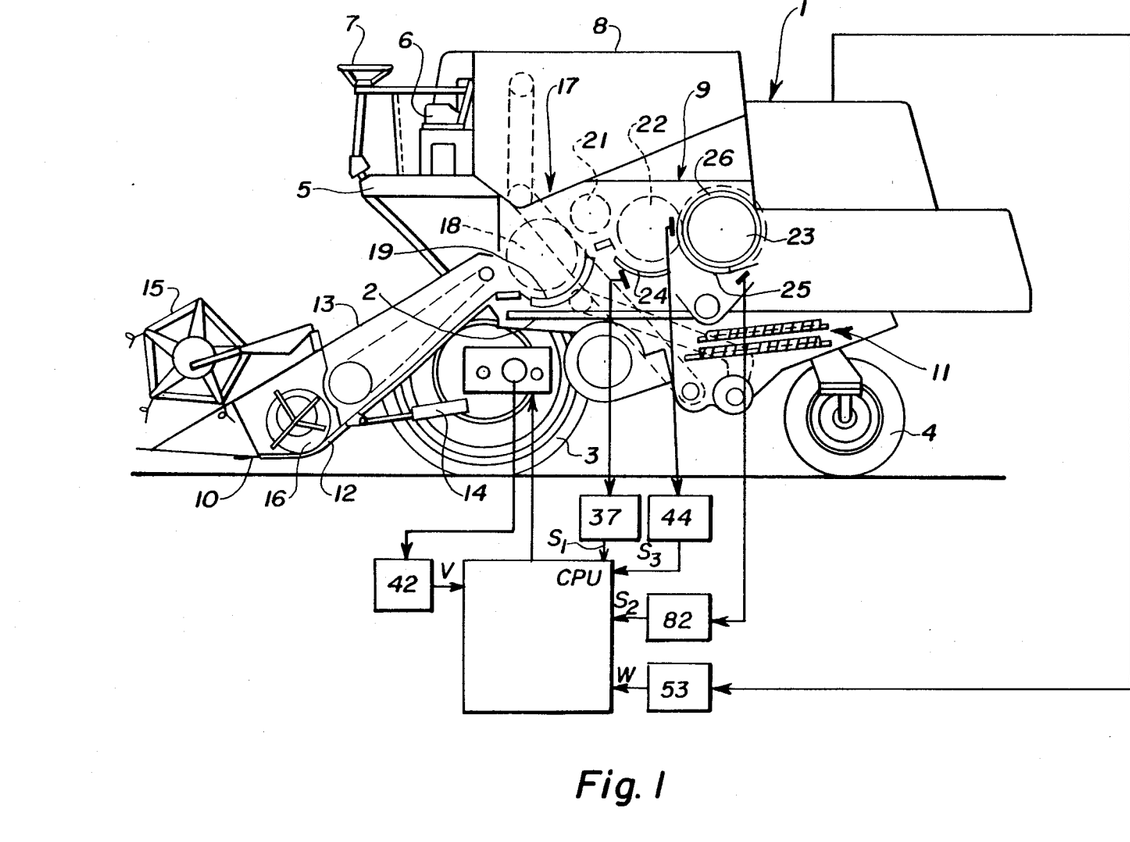
FIG. 1 is a diagrammatic side elevation of the combine harvester, shown fitted with a machine grain separation control system.

With reference to FIG. 1 of the drawings, the combine harvester, generally indicated at 1, comprises a main chassis or frame 2 supported on a front pair of traction wheels 3 and a rear pair of steerable wheels 4. Supported on the main chassis 2 are an operator's platform 5 with a driver's seat 6 and a steering wheel 7, a grain tank 8, a threshing and separating mechanism indicated generally at 9, a grain cleaning mechanism 11 and a conventional engine (not shown). The engine provides the motive power for the various driven components of the machine as well as for the traction wheels 3 which are driven via a conventional belt variator (also not shown). A conventional header 12 and straw elevator 13 extend forwardly of the main chassis 2 to gather crop material and convey it to the threshing and separating mechanism 9. The header 12 is pivotally secured to the chassis 2 for generally vertical movement which is controlled by extensible hydraulic cylinders 14.

As the combine harvester 1 is propelled forwardly over a field with standing crop, the latter is severed from the stubble by a sickle bar 10 on the header 12, whereafter a reel 15 and a header auger 16 convey the cut crop to the straw elevator 13 which supplies it to the threshing and separating mechanism 9. The crop received within the threshing and separating mechanism 9 is threshed and separated that is to say the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism 11 which comprises means to separate chaff and other impurities from the grain, and means to separate unthreshed materials (tailings). Cleaned grain is then elevated into the grain tank 8 and the tailings are reprocessed in separate tailings rethreshers (not shown) and returned to the cleaning mechanism 11 for repeat cleaning action.

The header 12 shown is of the grain type, but clearly other forms of header may be employed (for example a corn header), depending on the crop to be harvested. A threshing portion 17 of the threshing and separating mechanism 9 comprises a rotatable threshing cylinder 18 cooperable with a stationary threshing concave 19. Rearwardly of the threshing mechanism 17, a deflector beater, or so-called straw beater, 21 with an associated beater grate is provided. The straw beater 21 has a smaller diameter than the threshing cylinder 18 and is arranged above the level of the discharge end of the threshing concave 19. The straw beater 21 and beater grate have substantially the same width as the threshing mechanism 17.

A separator portion of the threshing and separating mechanism 9 comprises a first separator rotor or cylinder 22 and a second rotor or cylinder 23 cooperable with respective concaves 24 and 25. The second rotor 23 is mounted within a separator housing 26 and both of these components have a width substantially exceeding the width of the first rotor 22 which is the same width as the beater 21 and the threshing mechanism 17. Preferably, the rotor housing 26 has a width approximately twice that of the rotor 22.

The mat of crop material received by the separator rotor 23 from the separator rotor 22 is divided into two portions (by means not shown) which are moved spirally around the rotor 23 to respective ends thereof to complete the separating action. On reaching the ends of the rotor 23, the mats of crop material (straw) are propelled by the rotor through respective straw hoods 27 for discharge from the machine.

The components of the combine harvester so far described are disclosed in greater detail in British Specification No. 2.063.033 to which reference is made, and other components, including certain drives, are described in EP-B-No. 0.117.592 to which reference is also made. The descriptions of these two references are hereby incorporated by reference.

It will be appreciated that the rotary threshing and separating mechanism 9 according to FIG. 1 and briefly described hereabove is only one example of various types of threshing and separating mechanisms know in the art. Another embodiment of the present invention may comprise the more conventional straw walker type separator means as a substitute for the separator rotor 23 and associated separator concaves 25. In still another embodiment, the entire threshing and separating mechanism may be of a different type and may comprise one or two "axial flow" threshing and separating rotors cooperable with associated threshing and separating concaves, extending longitudinally of the combine harvester. A twin rotor "axial flow" combine of this type is disclosed in more details in GB-A-No. 1.339.601. Still other, less commonly used threshing and separating mechanisms are know in the art. The present invention is applicable on anyone of these type of combine harvesters and is used for controlling the grain losses occurring at the discharge end of either the separating mechanism 9 or the cleaning apparatus 11 or of both said separating mechanism and cleaning apparatus.

The machine is fitted with a grain separation control system which, in this preferred embodiment is used to control the ground speed of the machine, and is based on the measurement of the grain separation through the concave 24 under the rotary separator 22. This gives a fast, basic slave control loop for the system since the rotary separator 22 is located close to the front of the threshing and separating mechanism 9, whereby a quick control of the grain separation can be effected. The fast control loop is fine tuned by means of a slower master control loop based on grain loss measurement as now will be described more fully.

Figure 2:
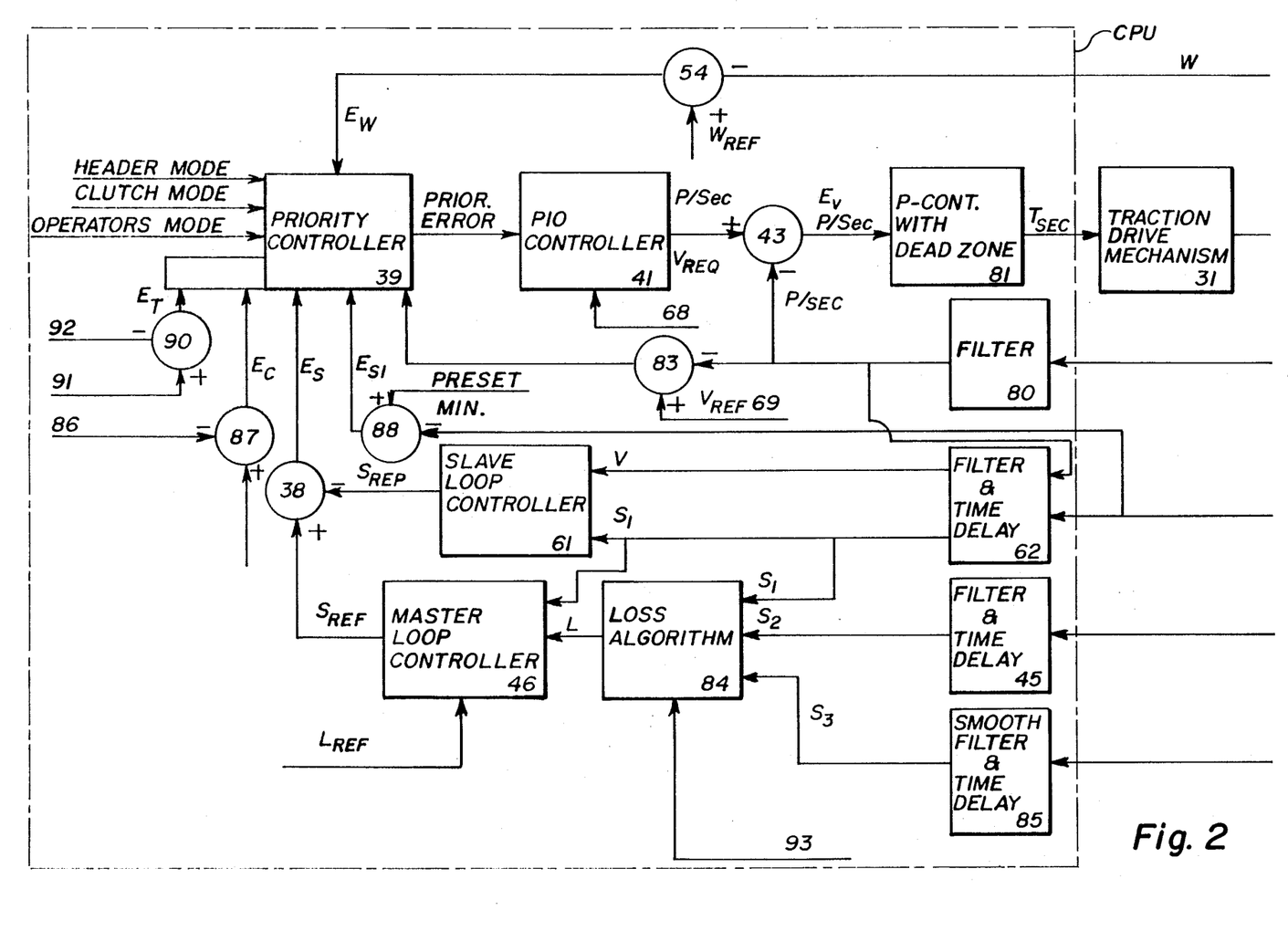
FIG. 2 is a block diagram of the control system shown in conjunction with certain machine operations.

FIG. 2 of the drawings shows a block diagram useful in explaining the present invention in greater detail, the diagram showing not only the control system (in full lines) but also certain operational functions and characteristics of the machine (in broken lines). The control system comprises in fact four control loops: the grain separator or slave control loop and the grain loss or master control loop already referred to; an engine control loop; and a ground speed control loop.

Looking first at the operational functions and characteristics of the combine harvester as depicted in FIG. 2, a traction drive mechanism is indicated at 31 and is in the form of the belt variator already referred to and which has associated with it the usual hydraulic cylinder and valve operable to vary the diameter of one of the sheaves in order to effect the desired change in speed. The revolutions per minute (V) of the output shaft of the traction drive mechanism 31 can be translated into a machine loading characteristic by multiplying by the diameter of the traction wheels 3 and the width of the sickle bar 10 (as indicated at 32) to provide a measure of the area of standing crop being cut per second (m²/sec), and by multiplying the latter by the crop density (as indicated at 33) to provide a measure of the weight of crop material being handled per second (kg/sec).

This volume of crop material, when fed to the threshing and separating mechanism 9, produces a grain separation S in the latter in kg/sec. The straw material is finally discharged from the machine as indicated by the arrow 34. Measurements of grain separation at different locations along the combine separation area are introduced into a loss algorithm which derives a representative grain loss signal L from the grain separation measurements. The loss algorithm referred to is disclosed in co-pending European Patent Application No. 88.200.802.2 which disclosure is hereby incorporated by reference and which will provide details of the algorithm which are not directly associated with the present invention. At the same time, the volume of crop material being handled also produces a torque in the combine harvester engine (as indicated at 35) by virtue of the engine having to drive the various crop processing components, and this in turn determines the rotational speed W of the engine (as indicated at 36). Thus there are established four parameters used in the control system, namely grain separation S, grain loss L, traction drive speed V and engine speed W.

Looking now at the control system and the grain separation or slave control loop in particular, this comprises a grain separation detector 37, which may be associated with the grain separation in the threshing and separating mechanism 9 in general, or with the grain separation through the concave 24 in particular. The grain separation sensor 37 produces an output signal $S_1$ representative of the grain separation through the concave 24, which may be applied to the negative input terminal of a summer 38. However, preferably, and as is shown in the drawings, a representative grain separation signal $S_{REP}$, derived from the aforementioned signal $S_1$ is applied to the input terminal of the summer 38 to reduce the risk of the grain separation control loop becoming unstable.

$S_{REP}$ is calculated in the slave loop controller 61 to which are applied on the one hand aforementioned grain on signal $S_1$ as measured by the grain separation sensor 37 and, on the other hand, the ground speed signal V of the traction drive mechanism 31 as measured by the traction shaft RPM sensor 42. The signals $S_1$ and V are applied to the slave loop controller via a smoothing filter 62.

Figure 3:
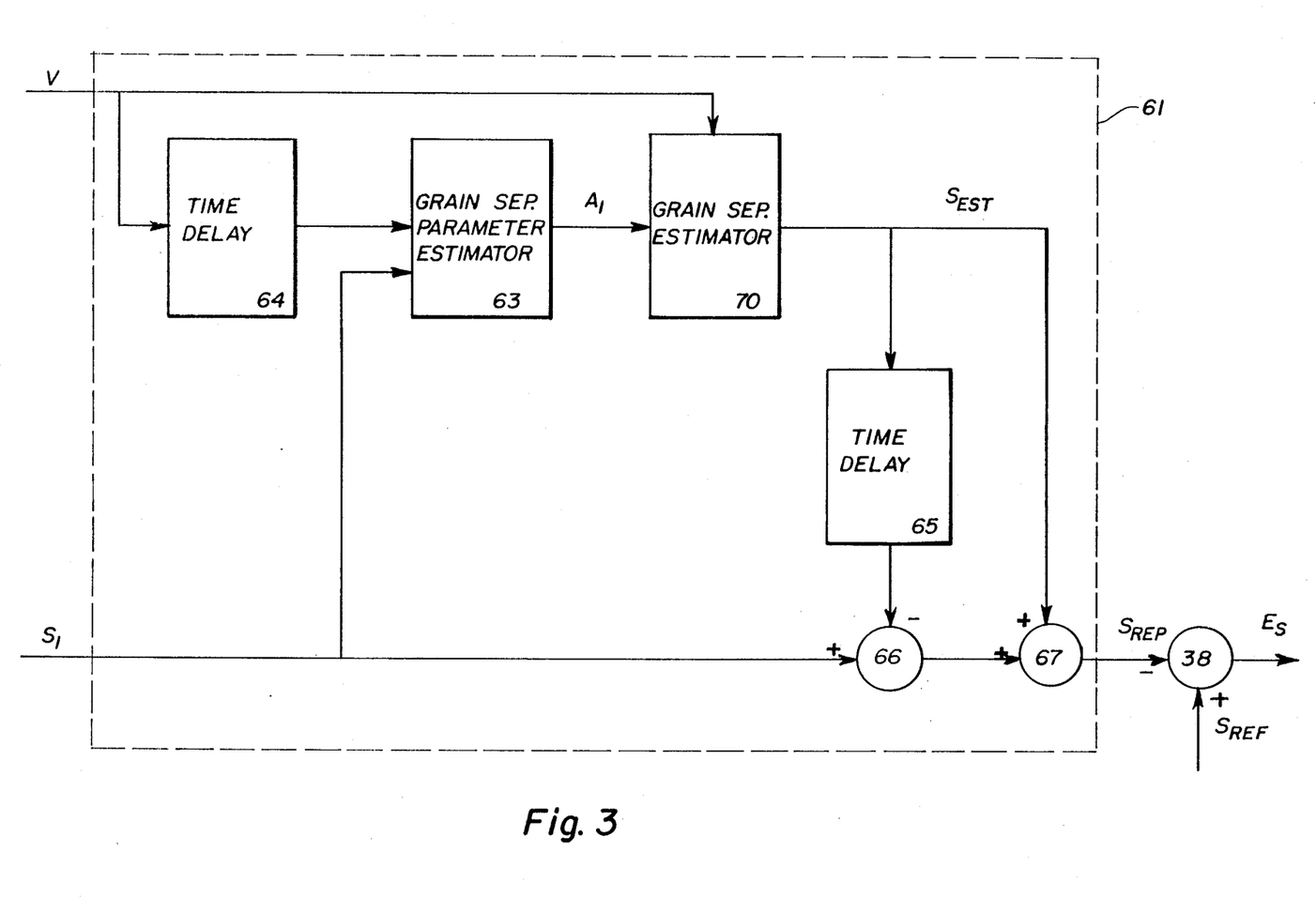
FIGS. 3 and 4 are more detailed block diagrams of parts of FIG. 2.

The slave loop controller 61 is shown in greater detail in FIG. 3 and comprises a grain separation parameter estimator 63 which is operable to establish the momentaneous second causal relationship between ground speed V and grain separation $S_1$. This relationship is expressed as:

$$V = A_1 \times S_1 + LL$$

where $A_1$ is a relation parameter to be determined by the estimator and LL is a fixed offset.

The ground speed signal V is fed into the grain separation parameter estimator 63 via a time delay 64 in order to obtain the correct phase relationship between that signal V and the grain separation signal $S_1$. The relation parameter $A_1$, determined as indicated above, is applied against the measured ground speed signal V in a grain separation estimator 70 to derive therefrom an estimated grain separation signal $S_{EST}$. The estimated grain separation signal $S_{EST}$ is applied via a further time delay 65, which is basically the same as the time delay 64, to the negative input terminal of a summer 66. The positive input terminal of the summer 66 receives the grain separation signal $S_1$, and thus the separation signal $S_1$ and the estimated grain separation signal $S_{EST}$ are brought in the correct phase relationship and algebraically summed to define a grain separation error signal.

This grain separation error signal and the estimated grain separation signal $S_{EST}$ are summed in a further summer 67 to produce a representative grain separation signal $S_{REP}$, which is thus derived from the measured ground speed V and which is obtained before the corresponding grain separation signal $S_1$ actually can be measured. It will be appreciated that, in practice, the relation parameter $A_1$ may fluctuate continuously and hence this parameter is continuously being recalculated and applied against the measured speed signals V continuously to derive therefrom $S_{EST}$ values. To this end, shift registers advantageously can be used.

As described, the representative grain separation $S_{REP}$ is applied to the negative input terminal of a summer 38 for comparison with a reference grain separation $S_{REF}$ produced by the loss control loop and applied to the positive input terminal of the summer 38. The loss control loop and the reference grain separation $S_{REF}$ will be described in greater detail hereafter. The output $E_S$ of the summer 38 is applied to a priority controller 39, the output of which is applied as a machine separation command signal to a grain separation controller 41 in the form of a PID (proportional-integrator-differentiator) controller and/or an adaptive control algorithm. The grain separation controller 41 produces an output signal of a given frequency (pulses per second) which is applied to the ground speed control loop inside the grain separation control loop. More specifically, the output $V_{REQ}$ of the PID controller 41 is applied to the positive input terminal of a summer 43, the negative input terminal of which receives the ground speed signal V from the traction shaft RPM detector 42 via a filter 80 for smoothing the ground speed signal V. The output $E_V$ of the summer 43 is applied to another PID-controller 81, which in a preferred embodiment is a P-controller with dead zone. This controller 81 produces an output signal T of a given duration (seconds) which is applied to the traction drive mechanism 31, in particular the control valve of the belt variator already referred to and driving the traction wheels 3 from the combine harvester engine.

The rotational output speed of the traction drive mechanism 31 is measured by the sensor 42 and the output V thereof is fed back directly to the summer 43 via the filter 80, as already described, and indirectly to the priority controller 39 via a summer 83 which receives as a second input 69 a reference ground speed signal $V_{REF}$, the meaning of which will be made apparent hereafter. The PID controller 41 further receives an input 68 which is provided by ways of signals representative of certain machine parameters such as, for example, the operational characteristics of the belt variator of the traction drive mechanism 31, the operational relationship between the belt variator and the traction drive mechanism (for example, the time to change the variator from minimum to maximum speed), the ratios of the gearbox associated with the engine, and the oil flow per unit time to the control valve. These signals help to achieve a more accurate grain separation control signal. Additional or alternative parameters may be used.

The grain separation control loop is designed to accommodate either a hydrostatic traction drive mechanism or the more normal belt variator drive and in the former case the output of the controller 81 is a voltage representative for the output of summer 43, the voltage being applied to a control valve for regulating the oil flow of the hydrostatic pump, whereas in the latter case a "high" (typically 12 volts) T signal, already referred to hereabove, is used to drive the valve associated with the variator. In the latter case, the duration of the T signal is a measure of the change in ground speed required.

The grain separation loop is enabled if the following conditions are met:
1. the system is switched to "automatic";
2. the operator is not claiming priority;
3. the engine RPM is normal;
4. the header 12 is in the operative position;
5. the engine clutch is operative;
6. the ground speed is greater than a predetermined minimum; and
7. the grain separation detection rate signal $S_1$ is greater than a predetermined fixed minimum.

With reference to the already mentioned co-pending European Patent Application No. 88.200.802.2, the master control loop will now be described in greater detail. The grain loss or master control loop includes grain separating sensing means 37, 82 and 44 associated with the grain separation process 9, their respective output signals $S_1$, $S_2$ and $S_3$ being applied, via respective smoothing filters and time delays 62, 45 and 85, to the loss algorithm 84. The time delays 62, 45 and 85 are operable to synchronise the outputs of the sensors 37, 82 and 44 positioned at different locations in the separating process. More specifically, sensor 37 is provided under the rotary separator 22 as already mentioned; sensor 44 is the conventional grain loss sensor provided near the discharge end of the separating mechanism 9 while sensor 82 is placed in the separation area between sensors 37 and 44. The loss algorithm 84 further receives input signals from other sensor means for measuring operating condition parameters. Those signals, generally indicated at 93, are representative of a.o. the moisture content of the crop being harvested and the flow rate of all material other than grain (i.e. mainly straw).

It should be appreciated that the number of grain separation sensors shown is not limitative. More sensors may be provided to further improve the accuracy of the indication while only two sensors, in certain circumstances, equally could provide satisfactory results.

The loss algorithm 84 produces a signal L which is representative for the grain loss and which is applied to the grain loss or master loop controller 46. Further direct inputs to the loss controller 46 are the output $S_1$ from the grain separation sensor 37 as well as a reference grain loss signal $L_{REF}$ which is set by the machine operator as is customary. In practice, the operator checks, during a start routine, whether actual grain loss experienced at the rear of the combine is at an acceptable level. Too high losses are, of course, unacceptable because of the amount of grain being lost. Too low losses equally are unacceptable as they mean that the desired maximum combine capacity is not being realized. If actual grain losses experienced correspond to the "desirable" losses, the grain loss signal produced by the grain loss algorithm 84 and corresponding to the actual grain losses, is marked as $L_{REF}$ in the microprocessor and put as such in the memory thereof.

If subsequently during operation of the machine the acceptable loss level is reduced or increased, then $L_{REF}$ is adjusted downwardly or upwardly, respectively, in an electronic manner by a chosen percentage, without the operator having to check again the actual losses occuring at the rear of the machine in the field.

The output from the loss controller is in terms of a grain separation reference signal $S_{REF}$ which is applied to the summer 38 along with the representative grain separation signal $S_{REF}$. The output from the summer 38 is an error grain separator signal $E_S$ and this is applied to the priority controller 39 as already described.

Figure 4:
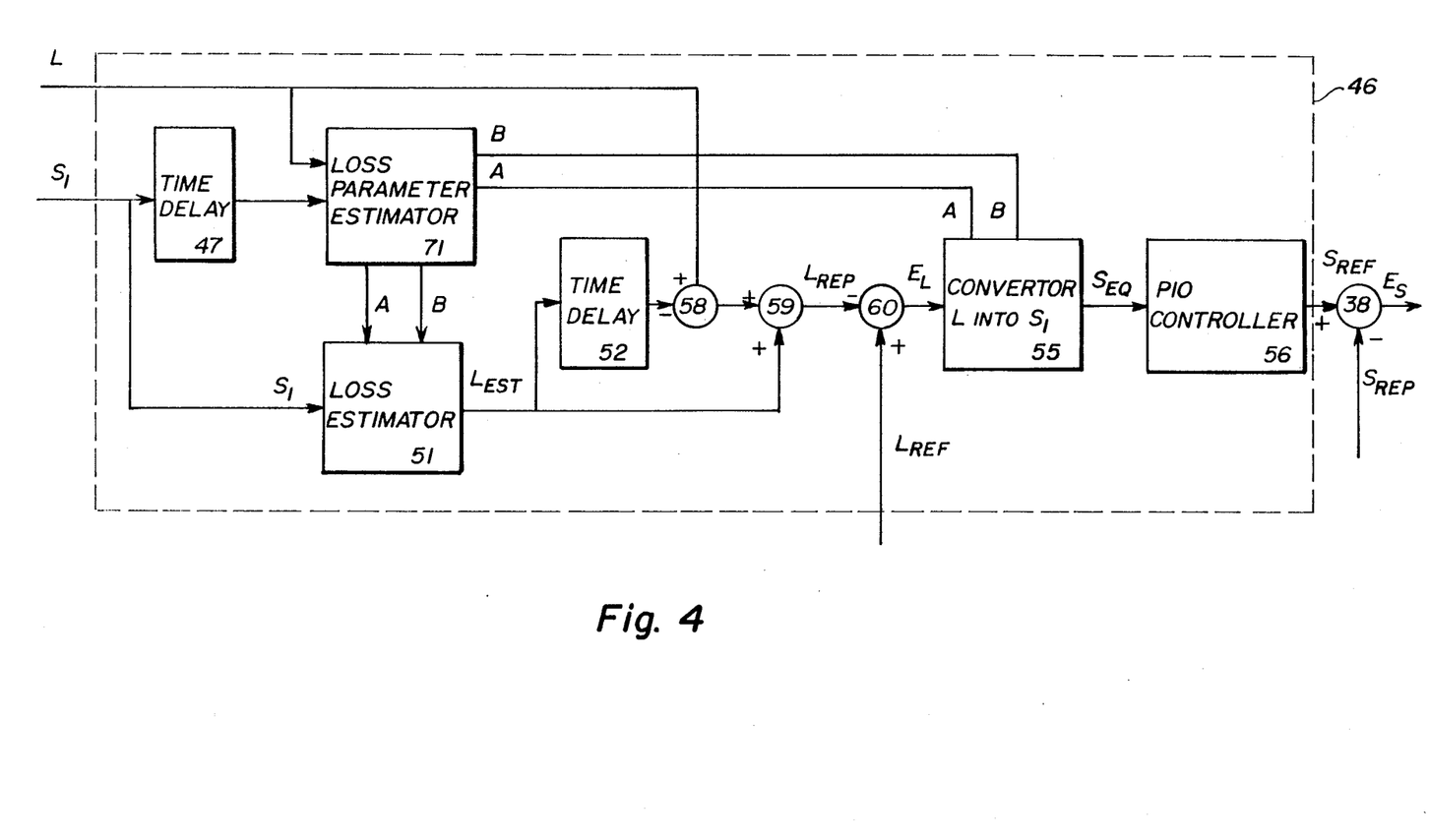

The master loop or loss controller 46 is shown in greater details in FIG. 4. The grain separation signal $S_1$ is applied to a loss parameter estimator 71 via a time delay 47 in order to obtain the correct phase relationship between that signal and the grain loss signal L. This is an extremely important aspect of the present invention and is introduced in order to accommodate the time lag discussed above between a given volume of crop material entering the machine and producing a corresponding grain separation signal and the grain loss associated with that grain separation being indicated. Another important advantage of the present invention results from the fact that the loss algorithm 84 to determine the grain loss receives input from grain separation detector means comprising the grain separation detector 37, which signal $S_1$ additionally is directly transferred to the slave loop or grain separation controller 61. The foregoing arrangement stabilises the relation between the grain separation $S_1$ and the grain loss L and accordingly stabilises the master-slave combination in the total control system.

The loss controller 46 thus comprises a shift register to which the grain separation and grain loss signals S,L are applied, the output from the register being subjected to regression analysis and parameter estimation at 71 to establish a relationship between grain separation and grain loss. The regression analysis is based on a two parameter model rather than a single parameter model and this is another important, although optional, feature of the present invention. The relationship between grain separation $S_1$ and grain loss L is expressed as:

$$L = A + BS_1 \text{ (linear) or } L = Ae^{BS_1} \text{ (exponential)}$$

In the loss parameter estimator 71, the relation parameters A and B, as used in the above equations, are determined. These relation parameters A and B and the grain separation signal $S_1$ are applied to a loss estimator 51 to derive an estimated loss signal $L_{EST}$ from the measured grain separation signal $S_1$, which signal is representative of the actual loss L which can be expected to occur several seconds later (5 to 10 seconds, depending on the type of combine harvester).

The estimated loss signal $L_{EST}$ is applied to a time delay 52 which, in essence, is identical to the time delay 47 (provided the microprocessor calculation and shifting times are neglected) and which is operable to present the estimated loss signal $L_{EST}$ in the correct phase relationship with respect to the actual determined loss signal L. Both loss signals are applied in the correct phase relationship to the input terminals of an algebraic summer 58 to produce a loss difference signal. The loss difference signal is algebraically added to the estimated loss signal $L_{EST}$ in a further summer 59 to produce a representative loss signal $L_{REP}$ which, in turn, is algebraically compared with the predetermined loss reference signal $L_{REF}$ in another summer 60 to produce a loss error signal $E_L$.

The loss error signal $E_L$ is converted back into an equivalent grain separation signal $S_{EQ}$ in convertor 55 using the relation parameters A and B as defined in the loss parameter estimator 71. This equivalent grain separation signal $S_{EQ}$ is finally applied to a PID controller 56 to stabilize and accelerate the control loop reaction. The output of the controller is a signal representing a reference grain separation $S_{REF}$, already referred to, which is applied to the summer 38 as previously described.

The purpose of the summers 58, 59, 60, the loss parameter estimator 71, and the loss estimator 51 is to reduce the adverse influence of the long process loop time on the stability of the control system. Indeed, there is a considerable loop time between the grain separation $S_1$ and the corresponding loss signal L as has already been explained. Accordingly, it is very important to be able to use in the control system an estimated loss signal $L_{EST}$ in lieu of the actual loss lignal L, which becomes available at too late a point in the loop to be useful. Actually, the estimated loss signal $L_{EST}$ is used in the control system before the actual corresponding losses occur. Obviously, the estimated loss signal $L_{EST}$ should be as close as possible to the actual loss signal L as is accomplished by the various steps as defined above.

As an alternative to regression analysis, the cluster analysis method may be employed which reduces the number of calculations required but still provides the required relationship between machine grain separation $S_1$ and grain loss which must be established in accordance with the present invention. In the present embodiment, this relationship is updated every five seconds, simultaneously with the production of $S_{REF}$. However, the frequency of these two operations need not be the same. The operational frequency of the slave grain separation control loop may be faster than the grain loss control loop. The basic data such as W and V is "read" every 0.1 seconds.

It will be appreciated from the foregoing that the loss controller 46 serves to establish the first causal relationship between grain separation and grain loss, each grain separation signal $S_1$ being applied against that relationship to provide a corresponding estimated grain loss signal from which is derived, as described above, a reference grain separation signal $S_{REF}$. It will be appreciated that the grain separation/grain loss relationship established here takes account of the loss algorithm.

Looking now at the two other control loops of the control system, the engine control loop comprises a sensor 53 operable to sense the rotational speed W of the output shaft of the engine of the combine harvester, the output of the sensor being applied as one input to a summer 54 which receives a predeteremined reference signal $W_{REF}$ as a second input. The difference between these two inputs to the summer 54 is fed as an error signal $E_W$ to the priority controller 39, which applies the error signal $E_W$ to the PID controller 41 which in turn derives therefrom a signal representative of the required ground speed $V_{REQ}$ in an identical manner as with the error signal $E_S$ from the grain separation control loop as already described.

It should be noted that also the RPM of shafts other than the engine shaft can be chosen as input for this control loop, in particular the RPM of a main shaft which is representative of the regime behaviour of the combine mechanism drive, this in lieu of the engine shaft RPM.

The ground speed control loop comprises, as already explained, a summer 43 which processes the required ground speed signal $V_{REQ}$ and the actual ground speed signal V and which derives therefrom the ground speed error signal $E_V$ which is used under certain conditions to control the ground speed. Another ground speed error signal $E_V$ is applied to the priority controller 39 via the summer 83, the negative terminal of which receives the actual ground speed signal V via filter 80, while a reference ground speed $V_{REF}$, already mentioned but still to be described in further detail hereinafter, is fed to the positive input terminal thereof. The latter ground speed error signal $E_V$ is transferred via the priority controller 39 to the PID controller 41, provided that priority is given by the controller 39.

The priority controller 39 is also provided with a grain loss error signal $E_C$ from the cleaning shoe grain loss sensing means (not shown) which produces a grain loss signal 86 representative of the grain loss measured at the discharge end of the cleaning shoe. A preset maximum grain loss value 89 is fed to the positive terminal of the summer 87, while the actual grain loss signal 86 is connected to the negative terminal thereof, the summer 87 producing via an algebraic summation, the error signal $E_C$, representative of the grain loss above the preset maximum.

Furthermore, the priority controller is provided with a header auger torque error signal $E_T$ from the auger torque sensing means (not shown) which produces a signal 92 representative of the crop intake in the machine. Torque measurements in components of the combine harvester other than the header auger equally may be used for establishing the level of crop intake. The signal 92 is fed to the negative terminal of a summer 90, while a preset maximum signal value 91 is fed to the positive terminal of the summer 90, which produces, via an algebraic summation, the error signal $E_T$, representative of the overload sensed in the header auger.

The priority controller moreover is provided with a grain separation error signal $E_{S1}$. This error signal $E_{S1}$ is produced by a summer 88 via algebraic summing of the grain separation sensing signal $S_1$ fed at its negative terminal and a preset minimum value for the grain separation sensing signal at its positive terminal, this in order to give input to the priority controller 39 in case no grain separation takes place.

The mentioned error signals $E_{S1}$, $E_S$, $E_C$ and $E_T$ are used to render the priority controller 39 partly inoperative following the setting of priorities, the order of which can be changed, and which are dependent of crop related condition signals, such as separation, and some other input signals to be explained hereafter, which are representative of the priority mode to be applied.

The priority controller 39 is provided in order to introduce safeguards into the control system. In addition to the already mentioned input signals, it also receives input signals representative of the header mode, the clutch mode and the operator's mode. By "header mode" is meant whether the header 12 is in the lowered, operative position of FIG. 1, or the raised, inoperative position and by "clutch mode" is meant whether the clutch associated with the traction drive mechanism is operative or inoperative. By "operator's mode" is meant whether the operator is claiming priority over the automatic control system for manual intervention, or whether the automatic control system is controlling the operation of the machine.

Still further inputs to the priority controller 39, which are not specifically recited in FIG. 2, are a time delay and a minimum ground speed, these inputs being predetermined. The time delay is used to allow $S_{REF}$ to be established only after the predetermined delay following the enabling of the grain separation control loop. This avoids the loss control loop functioning during a transient period when the grain loss is not stabilized.

First overriding priority is given to the operator in the event he wants manually to intervene in the operation. Under this condition of manual intervention, the electronic circuitry remains operative as far as measuring, calculating and memorizing are concerned. Only the actuation of the traction drive adjusting mechanism by the electronic circuitry is interrupted as such actuation is done manually at that moment. Second overriding priority is given to an ON/OFF switch. If the switch is on "OFF", the electronic circuitry again continues to measure, calculate and memorize. However, actuation of the traction drive adjusting mechanism by the electronic circuitry is excluded.

Third overriding priority is given to the engine control loop on the basis that if, for whatever reason, engine torque increases to such an extent that the engine suffers a serious decrease in output RPM (and may stall) then plugging of the machine can occur, which must be avoided. The reference signal $W_{REF}$ is set to represent the engine speed when the machine is empty and this is compared with the actual speed W and if the difference ($E_W$) exceeds a predetermined value, the priority controller 39 effectively renders all of the other control loops inoperative. The $E_W$ signal produces, in this circumstance, an output signal from the priority controller 39 which reduces the ground speed of the machine and this signal is maintained for as long as $E_W$ exceeds the predetermined value. Thus the loading of the machine is reduced (as a result of the decrease in ground speed) until the engine torque drops to a value where $E_W$ no longer exceeds the preset value.

Fourth overriding priority is given to the grain loss error signal $E_C$ from the cleaning shoe on the basis that, if, for whatever reason, the grain loss error signal $E_C$ becomes a negative value for a preset minimum period of time in the order of seconds, the priority controller 39 renders all of the other control loops partly inoperative in as much as the electronic circuitry continues to detect, memorize and calculate, but the actuation of the traction drive adjusting mechanism by the electronic circuitry of the other control loops is excluded. The error signal $E_C$ is fed to the PID controller which reduces the ground speed of the machine in accordance with the error signal received, until the error $E_C$ again is positive for a certain time.

Fifth overriding priority is given to the auger torque error signal $E_T$, which comparable to the cleaning grain loss error signal $E_C$, renders all the other control loops partly inoperative. The error signal $E_T$ is fed to the PID controller 41 which reduces, in a similar manner as described just before, the ground speed of the machine to decrease the header auger torque until the value of the error $E_T$ again is positive for a certain time.

The grain separation and grain loss control loops are rendered completely inoperative if the header 12 is raised to the inoperative position because crop material is then no longer taken into the machine so that the grain separation and grain loss will decrease further with the result that a higher ground speed would be commanded which would be inappropriate. By the same token, de-actuation of the engine clutch also renders the grain separation and grain loss loops ineffective, otherwise again an inappropriate increase in ground speed would be commanded. Furthermore, a too low level of grain separation detected by sensor 37 also renders the grain separation and grain loss loops ineffective because, for some reason, there is no material taken into the machine. This happens when the grain separation error signal $E_{S1}$ becomes positive.

The ground speed control loop has an important function when it comes to manipulating the machine at the end of a run in preparation for the next run or pass. When at the end of a run the machine comes to the so-called headland and runs out the standing crop, the operator normally lifts the header 12. Thus the grain separation and grain loss loops are rendered inoperative, as already explained, and in this circumstance the operator can freely manoeuvre the machine. Usually, the machine is accelerated whilst turning on the headland and approaching the standing crop in preparation for the next run. Thus, the machine speed exceeds the normal operating speed. At this moment, the machine is empty, whereby the grain separation is low and no losses are measured. Hence, provided no precautions were taken, the control system would command an even higher speed as soon as the header is lowered to the operative position, thereby re-enabling the grain separation and grain loss loops. This continues even as the machine is actually entering the standing crop as indeed, grain separation builds up only with a certain time delay and losses occur after an even longer time delay. In reality, however, ground speed should often be reduced substantially and if it is not then eventually this may result in complete plugging of the machine.

Provisions have been made to cope with this problem. As the header is lifted, the ground speed data recorded over the previous 5 seconds is used to calculate a reference speed $V_{REF}$. The same action occurs when the engine clutch is de-actuated or if for any reason the grain separation $S_1$ or ground speed V drops below respective preset minimum values. The ground speed signal V and the reference speed signal $V_{REF}$ are algebraically summed in the summer 83 to produce a speed error signal $E_V$ which is applied to the priority controller 39.

For as long as either the header 12 is in the inoperative position, the clutch is de-activated, or the ground speed or grain separation is below the preset minimum, the entire control system remains inoperative and the operator can freely manoeuvre the machine whilst $V_{REF}$ is kept in the memory. As soon as the header 12 is lowered to the operative position (or the clutch re-activated or the ground speed exceeds the preset minimum value), the speed control loop is enabled, provided the grain separation $S_1$ is below the minimum value. The ground speed error signal $E_V$ derived from the actual ground speed V and the reference ground speed $V_{REF}$, in the manner as described above, is used to control the ground speed, whereby a ground speed similar to that pertaining when the machine reached the headland will be implemented. In normal crop conditions, this is an entirely satisfactory procedure because the crop condition is unlikely to change materially between running out of the crop at one point and re-entering the crop at an adjacent point. Thus, in practice, when entering the crop for a new run or pass, and depending on the actual ground speed, usually an initial ground speed decrease is commanded and effected rather than a ground speed increase. Thus, the above discussed problem is adequately solved.

Once the grain separation $S_1$ exceeds the predetermined value on crop material once again being fed to the threshing and separating mechanism 9, then the grain separation control loop is enabled and the control system operates in the manner described. The loss control loop is enabled only after the expiration of a preset period of time following the enabling of the grain separation control loop. This avoids the loss control loop functioning and producing corrective actions, during a transient period needed for the grain losses to stabilize. For as long as the loss control loop is not yet enabled, an $S_{REF}$ value, which was calculated at the end of the next preceding normal operating condition and memorized in the microprocessor, is applied to the positive input terminal of the summer 38 for enabling the grain separation controller loop for proper operation.

The use of the grain separation in the slave loop of the control system is preferred because the crop characteristics, weather conditions and machine adjustments which influence the grain loss also directly influence the grain separation in the same sense. This makes the relation between the grain separation and the grain loss algorithm, receiving input for grain separation measurements, and thus the control loop stable and hence fast, because the grain separation detector 37 is placed as close as possible to the front of the separating mechanism.

It has been experienced that also machine loading in general could provide an indication of grain loss on the basis that the more heavily the machine is loaded, the greater the grain loss is likely to be, although this is not necessarily so. Machine loading can be monitored in various ways, such as by sickle bar power consumption (although this would be undesirable as the cutting height and knife sharpness would introduce inaccuracies), the displacement of the undershaft of the straw elevator 13, power consumption or torque in the threshing and separating components, or engine power or torque or contactless microwave crop density measurement in front of the header, or torque in the transportation components in the header and between the header and the threshing and separating components. All those inputs give a tremendous variation in their relation with grain loss in varying crop characteristics, weather conditions and machine adjustments, and as such can not be relied upon for effectively controlling the combine grain loss.

Grain separation monitoring on the other hand is preferred because of the resulting fast control loop which can be used universally in various crop conditions as the relation between grain separation and grain loss is quite stable, providing a universal stability of the control system. Furthermore, the control system can be applied to as well the conventional walker type combines as the rotary type machines and with all type of headers such as grain headers and corn headers, for example.

With the use of the engine control and ground speed control loops in addition to the grain separation and grain loss control loops, the preferred embodiment gives rise to a very practicable control system. The refinement afforded by the ground speed control loop is especially welcome in that if the operator attempts to re-enter the standing crop at too high a speed, the speed control loop will command a lower speed (based on that previously pertaining) and hence avoid machine plugging. Equally, the top priority given to the engine control loop avoids plugging. The control system reduces operational costs since it reduces, if not obviates, the incidence of machine plugging and maintains grain loss substantially constant with respect to the level of grain loss set by the operator. Also operator fatigue is reduced since many of the checking, controlling and adjusting functions previously attended to by the operator are now carried out by the automatic control system.

Figure 5:
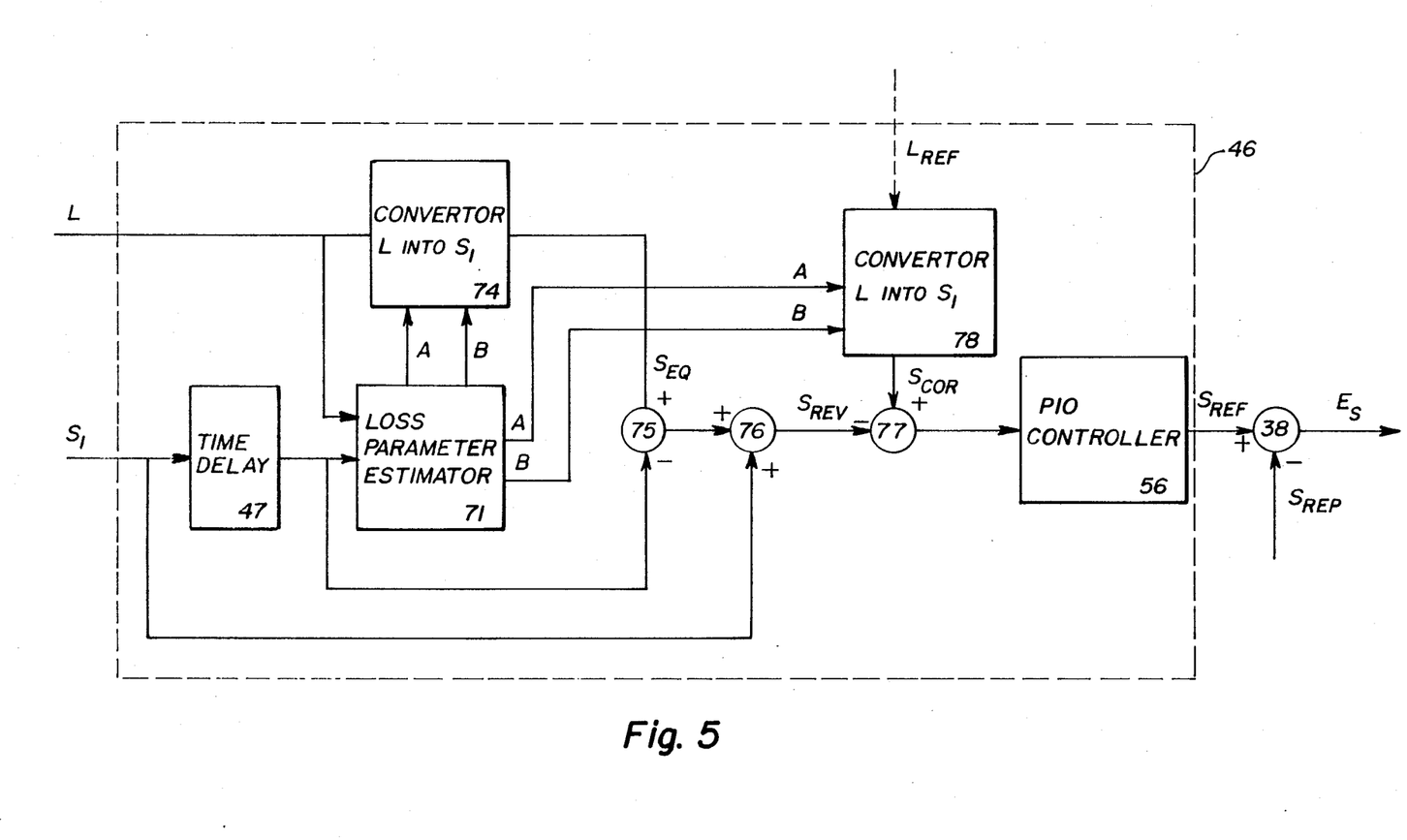
FIG. 5 is an alternative block diagram to that of FIG. 4.

With reference to FIG. 5, an alternative arrangement for the master loop or loss controller 46 shown in FIG. 4 will now be described. Basically, in the arrangement according to FIG. 4 grain separation values $S_1$ are converted into equivalent loss values prior to making comparisons and calculations. The results of the comparisons and calculations are converted back into grain separation values towards the end of the control loop to produce the desired $S_{REF}$ value.

In the arrangement according to FIG. 5, precisely the opposite is done to the extent that loss values are converted into equivalent $S_1$ values prior to comparison and calculation. Thereby, it is not necessary to convert the results of the calculations back into $S_1$ values at the end of the control loop. As in the arrangement of FIG. 4, the loss controller 46 of FIG. 5 also comprises a shift register to which the grain separation and grain loss signals $S_1$, L are applied, the output from the register being subjected to regression analysis and parameter estimation at 71 to establish a relationship between grain separation $S_1$ and grain loss. Again, a time delay 47 is provided for presenting the grain separation signal $S_1$ in correct phase relationship with the loss signal L to the loss parameter estimator 71.

The parameters A and B defined in the estimator 71 are used in the convertor 74 to convert the loss signal L to an equivalent grain separation signal $S_{EQ}$. This equivalent grain separation signal $S_{EQ}$ is algebraically summed in the summer 75 with the corresponding, i.e. delayed, grain separation signal $S_1$ to produce a grain separation error signal at the output thereof. The grain separation error signal is algebraically added to the grain separation signal $S_1$ (not delayed) in the summer 76 to produce a revised grain separation signal $S_{REV}$.

Using in a convertor 78 the relation parameters A and B as produced in the parameter estimator 71, a predetermined loss reference signal $L_{REF}$ is converted into a corresponding grain separation reference signal $S_{COR}$ which is fed to the positive input terminal of yet another summer 77 for comparison with the revised grain separation signal $S_{REV}$ which is applied to the negative input terminal of that summer. The output of the summer 77 is a grain separation error signal which is fed to the PID controller 56 to stabilize and accelerate the control loop reaction and to produce the reference grain separation signal $S_{REF}$ which is applied to the summer 38 as already described.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. In a combine harvester having an engine, a traction drive transmission, a header, a threshing and separating mechanism and a machine throughput control system including a grain loss control loop operable to produce a signal representative of grain loss and including a grain loss controller to which the grain loss signal and a reference grain loss signal are applied, an improved machine throughput control system comprising:
a grain separation control loop operable to produce a signal representative of the grain- separation in the machine, the grain loss controller being operable continuously to derive a reference grain separation signal from the grain separation signal, the grain loss signal and the reference grain loss signal; and
means for algebraically summing the grain separation signal and the reference grain separation signal to produce a grain separation error signal which is used to control the machine throughput.

2. In a combine harvester according to claim 1 wherein the grain separation control loop comprises a grain separation sensor and a grain separation controller which receives the output signal from the grain separation sensor and a ground speed signal from a ground speed sensor via a time delay operable to present the ground speed signal in phase with the grain separation signal, and further comprises means for continuously establishing a relationship therebetween, the ground speed signal being applied against said relationship current a that time to derive the corresponding representative grain separation signal.

3. In a combine harvester according to claim 2 wherein the grain separation controller comprises:
a grain separation parameter estimator operable continuously to establish said relationship, a grain separation estimator operable to derive an estimated grain separation signal from the ground speed signal and said relationship;
a further time delay operable to present the estimated grain separation signal in phase with the measured grain separation signal to first summer means for algebraic summation to produce an error signal; and
second summer means for adding the error signal to the estimated grain separation signal to produce said representative grain separation signal.

4. In a combine harvester according to claim 3 wherein the grain loss control loop comprises grain separation sensors which provide input to a loss algorithm for deriving an indication of grain loss therefrom, and wherein the grain loss controller receives the output signal from the loss algorithm and a time delayed signal from the grain separation control loop, the time delay being operable to place the grain separation signal in phase with the grain loss signal, determined by the loss algorithm, for the grain loss controller to establish a relationship between grain separation and grain loss.

5. In a combine harvester according to claim 4 wherein the grain loss controller comprises:
a grain loss parameter estimator operable continuously to establish the relationship between the grain separation signal, received via the time delay, and the grain loss signal;
a loss estimator operable to derive an estimated loss signal from the grain separation signal and said relationship current therewith;
a further time delay operable to present the estimated loss signal in phase with the measured loss signal;
first summer means for algebraically summing the estimated loss signal received from the further time delay and the measured loss signal to produce an error signal;
second summer means for adding the error signal to said estimated loss signal to produce a representative loss signal;
third summer means for algebraically summing the representative loss signal and a reference loss signal to produce a loss error signal; and
convertor means for applying the loss error signal against the relationship between grain separation and grain loss current at that time to derive therefrom the reference grain separation signal.

6. In a combine harvester according to claim 4 wherein the grain loss controller comprises a grain loss parameter estimator operable continuously to establish the relationship between the grain separation signal, received via the time delay, and the grain loss signal;

first convertor means for applying the grain loss signal against said relationship current at that time to derive therefrom an equivalent grain separation signal;

first summer means for algebraically summing the equivalent grain separation signal and the grain separation signal received from the time delay to produce an error signal;

second summer means for adding the error signal to the measured grain separation signal to produce a revised grain separation signal;

second convertor means for applying the reference loss signal against the relationship between grain separation and grain loss current at that time to derive therefrom a corresponding grain separation signal; and third summer means for algebraically summing the corresponding grain separation signal derived from the reference loss signal and the revised grain separation signal to derive therefrom the reference grain separation signal.

7. In a combine harvester according to claim 4 wherein a first PID controller is provided in the grain separation control loop, an input of which is formed by the grain separation error signal and the output of which is connected to the traction drive transmission, and wherein a second PID controller is provided in the grain loss control loop, the output of which is formed by the reference grain separation signal.

8. In a combine harvester according to claim 7 wherein the throughput control system comprises shift registers to which the measurement signals are applied.

9. In a combine harvester according to claim 4 wherein the means for establishing the relationship between the grain separation and grain loss are based on regression or cluster analysis of a two parameter model.

10. In a combine harvester according to claim 9 wherein said relationship is updated at a predetermined interval.

11. In a combine harvester according to claim 10 wherein the response of the grain separation control loop is faster the response of the grain loss control loop.

12. In a combine harvester according to claim 11 wherein the throughput control system further comprises a ground speed control loop having a sensor operable to measure ground speed of the machine, memory means for storing ground speed data pertaining to a predetermined period of time of normal machine operation, calculator means for calculating a reference ground speed from the memorized data pertaining to the predetermined period of time of normal machine operation preceding a period of time in which the machine is in a mode of operation in which current grain separation and/or grain loss data is not available or does not meet preset criteria, and summer means to which the output of the ground speed sensor is applied together with the calculated reference ground speed, the output of the summer means being a ground speed error signal which is used to control the ground speed when the machine is returning to a normal machine operation condition from the operation mode in which current grain separation and grain loss data is not available or does not meet said preset criteria.

13. In a combine harvester according to claim 12 wherein the throughput control system further comprises an engine control loop having a sensor operable to measure the rotational output speed of the engine, and a summer to which are applied the output signal of the engine speed sensor and a predetermined reference speed signal, the output of the summer being an engine speed error signal used to control machine throughput if the rotational output speed falls below a predetermined reference speed.

14. In a combine harvester according to claim 13 wherein the throughput control system further comprises a priority controller common to all the control loops and arranged to give overriding priority to the engine control loop, whereby if the rotational speed falls below a predetermined reference speed, all other control loops are rendered inoperative.

15. In a combine harvester according to claim 14 wherein the priority controller also receives input signals representative of other parameters of the machine which determine whether one or more control loops of the throughput control system should be rendered inoperative.

* * * * *